Jan. 5, 1960  R. C. WALTER  2,919,777
MAGNETIC TORQUE PRODUCING DEVICE
Filed June 9, 1958  2 Sheets-Sheet 1
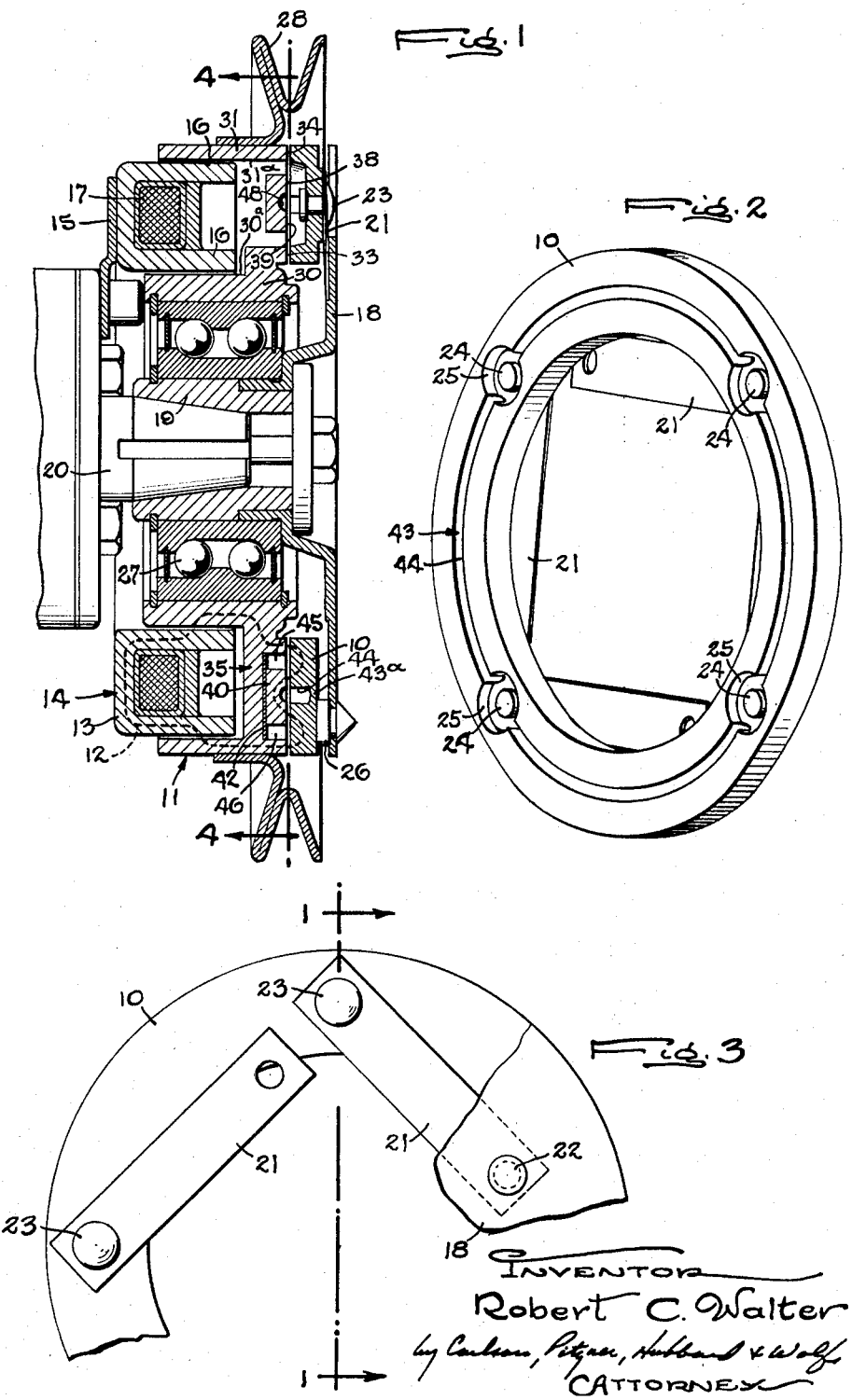
INVENTOR
Robert C. Walter
by Carlson, Pitzner, Hubbard & Wolf
ATTORNEYS Jan. 5, 1960 R. C. WALTER 2,919,777
MAGNETIC TORQUE PRODUCING DEVICE
Filed June 9, 1958 2 Sheets-Sheet 2
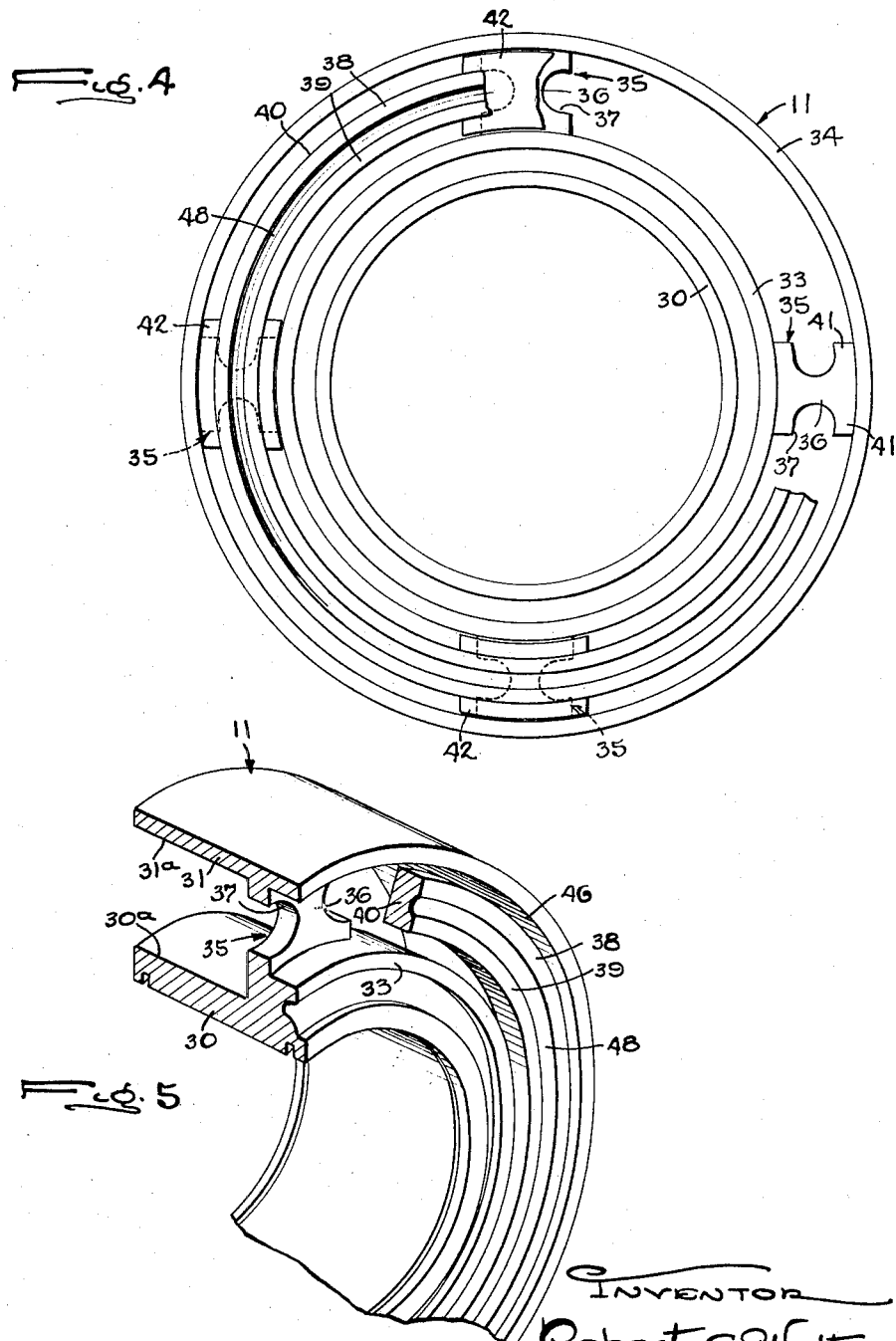

United States Patent Office 2,919,777
Patented Jan. 5, 1960

2,919,777
MAGNETIC TORQUE PRODUCING DEVICE

Robert C. Walter, Beloit, Wis., assignor to Warner Electric Brake & Clutch Company, South Beloit, Ill., a corporation of Illinois Application June 9, 1958, Serial No. 740,848

3 Claims. (Cl. 192—84)

This invention relates to magnetic clutches or brakes having relatively rotatable magnet and armature rings adapted to be drawn into axial gripping engagement by magnetic flux threading a toroidal path which extends back and forth a plurality of times through the armature and the magnet pole faces.

The primary object is to provide a magnetic coupling of the above character having a magnetic pole piece unit constructed in a novel manner to form at least four radially spaced annular pole faces included in a multiple or zigzag flux path.

A more detailed object is to form the inner two of the pole faces on a separate ring supported in a novel manner by spokes rigidly joining the pole rings which form the inner and outer pole faces.

Other objects and advantages of the invention will become apparent from the following detailed description taken in connection with the accompanying drawings, in which:

Figure 1 is a fragmentary diametrical cross-sectional view of a magnetic friction coupling embodying the novel features of the present invention, the section being taken along the line 1—1 of Fig. 3.

Fig. 2 is a perspective view of the coupling armature.

Fig. 3 is a fragmentary rear view of the coupling armature.

Fig. 4 is a fragmentary face view of the magnetic pole unit, as viewed along the line 4—4 of Fig. 1.

Fig. 5 is a fragmentary perspective view of the pole unit.

While the invention may be utilized in electromagnetic friction brakes, it is shown in the drawings for purposes of illustration incorporated in a clutch of the so-called stationary field type comprising generally a flat armature ring 10 adapted to be drawn into axial gripping engagement with the face of a rotatable pole unit 11 by magnetic flux threading a toroidal path 12 formed by coaction of the armature, the pole unit, and the core 13 of a magnet 14. In the present instance, the core is a magnetic ring of U-shaped cross-section secured to and supported on a suitable stationarily mounted bracket 15 and having cylindrical legs 16 concentric with the clutch axis. A multiple turn annular winding 17 is disposed between these legs and securely fastened within the core.

In this instance, the armature constitutes the driven element of the clutch and comprises a flat ring of magnetic iron mounted for limited axial movement on a flange 18 coupled to a hub 19 on a driven shaft 20. The armature support comprises a plurality of tangentially disposed and angularly spaced leaf springs 21 each clamped by a rivet 22 at one end to the flange 18 and at the other end to the back of the armature 10 by a rivet 23 having a head 24 disposed in a recess 25 in the face of the armature. Rubber buttons 26 constitute stops for limiting the movement of the aramture axially away from the pole unit.

The pole unit 11 is pressed onto or otherwise secured to the outer race sleeve of a bearing 27 whose inner sleeve is fixed to the hub 19. Rotary power is transmitted to the pole unit by a belt engaging a pulley 28 fixed to the outer periphery of the pole unit. The latter comprises inner and outer rings 30 and 31 of magnetic material precisely concentric with the clutch axis and having cylindrical surfaces $30^a$ and $31^a$ whose rear end portions telescope closely with opposed surfaces formed on the inner and outer peripheries of the inner and outer legs 16 of the magnet core. The opposite ends of the pole rings terminate in pole faces 33 and 34 of narrow radial width lying in a common transaxial plane and overlapped by the inner and outer portions of the flat armature face.

Intermediate their ends and at points disposed near the faces 33 and 34, the pole rings are joined rigidly by radially disposed spokes 35, four in the present instance, spaced equidistantly around the unit and having at the narrowest points 36 a combined cross-section which is a small fraction, usually about ten percent of the total area of the inner pole face 33. This minimizes the by-passing of useful flux between the pole rings and away from the armature.

To facilitate low cost manufacture of the pole unit, the rings 30 and 31 and the spokes 35 are formed from a single piece of iron by stamping, casting or forging followed by machining of the surfaces which are to be located accurately. In this instance, the spokes are flat and parallel to the plane of the pole faces 33 and 34 and recessed intermediate their ends and at opposite side edges as indicated at 37 so as to impart the desired reduced area to the spokes at the midpoints 36.

With the arrangement thus far described, it will be apparent that the magnet core, the pole unit and the armature provide a toroidal flux path encircling each section of the coil 17 and extending from one pole face 33 into the armature, then radially across the latter and back into the other pole face. The present invention aims to increase the attractive force derived from the magnetic by a novel and simple addition to the armature and pole unit structure which at least doubles the number of magnet pole faces and therefore the number of times which the flux threads back and forth between the armature and pole unit.

The additional pole faces indicated at 38 and 39 are formed by the inner and outer edge portions of the front face of a flat ring 40 of magnetic material substantially narrower radially than the space between the pole faces 33 and 34 and secured to the spokes 35 so that the latter are utilized as a rigid backing for sustaining the axial thrust and distributing the total gripping force quite uniformly over all four of the pole faces. To this end, the ring 40, whether a continuous annulus as shown or made of arcuate segments, overlaps the widened end portions 41 of the spokes and is secured rigidly to the latter as by welding. Preferably, though not necessarily, a thin shim 42 of non-magnetic material such as stainless steel is interposed between the ring 40 and each of the spokes. The shims provide non-magnetic gaps, usually about .020 of an inch thick, which avoid objectional by-passing of flux across the spoke restrictions 36. As a result, the rigidity of the backing may be increased by widening the ends of the spokes at 41 without substantially increasing the loss of useful flux.

The spokes are spaced below the pole faces 33 and 34 far enough to permit the ring 40 to be of the thickness required to carry the total useful flux edgewise through the ring. To define the pole faces 38 and 39 on the ring and cause the flux to thread the zigzag path 12 (Fig. 1), the inner and outer portions of the armature are separated radially by a high reluctance area 43 around a circumference which is disposed about midway between the inner and outer edges of the ring 10. While such area may be achieved in various ways, it is preferred to leave the armature in one integral piece by cutting a groove 44 around its working face substantially to the full depth of the armature while leaving the inner and outer portions thereof joined integrally by the thin annulus 43a.

With the armature and pole unit thus constructed, the inner edge portion of the armature overlaps the inner two pole faces 33 and 39 and spans the radial gap 45 between the latter. In a similar way, the outer pole faces 34 and 38 and the intervening gap 46 are bridged by the portion of the armature face outwardly beyond the flux barrier formed by the groove 44. The latter in turn is bridged by the pole ring 40. As a result, the magnetic flux path between the pole face ends of the pole rings 30 and 31 extends zigzag fashion from the outer pole face 34 into the armature 10, then radially through the latter across the gap 46 and back into the pole face 38 or outer edge portion of the ring 40. After passing radially and inwardly across the latter and around the armature groove 44, the flux is diverted by the gap 45 into the armature and finally leaves the latter by way of the inner pole face 33.

By thus threading back and forth twice through the opposed faces of the pole unit and armature, the attractive force of the magnet is augmented and substantially doubled as compared to a single back and forth pass. This increase is achieved by very simple changes in the standard construction of the pole unit 11 and the armature 10, that is, by cutting the groove 44 in the armature face and by properly locating the spokes 35 axially of the pole unit and securing the intermediate ring 40 thereto.

If desired, the service life of the pole unit may be increased by filling the gaps 45 and 46 with suitable non-metallic friction material. Also, to minimize the loss of useful flux after wearing away of the engageable faces, it is desirable to cut away that area of the face of the intermediate ring 40 which is not subject to wear because of its location opposite the armature groove 44. This is accomplished by cutting a shallow annular groove 48 in the working face of the ring.

This application discloses subject matter common to the disclosure of and claimed generically in William C. Pierce application Ser. No. 550,282, filed December 1, 1955.

I claim as my invention:

1. In a magnetic torque producing device, the combination of, inner and outer tubular rings of magnetic material concentric with a common axis and having first and second pole faces at one of their ends lying in a common transaxial plane, angularly spaced and radially disposed flat spokes of the same material as said rings paralleling said plane and joined integrally at their inner and outer ends to the respective rings intermediate the ends of the latter so as to connect said rings rigidly together, the combined cross-sectional area of said spokes being a small fraction of the area of one of said pole faces whereby to avoid substantial by-passing of flux between said rings and through said spokes, a flat ring of magnetic material narrower than the radial spacing of said pole faces lying against and rigidly secured to said spokes with the inner and outer edges of the ring spaced radially from said inner and outer rings, said flat ring having in its outer surface an annular groove shallower than the ring and disposed intermediate the peripheries thereof so as to divide the surface into third and fourth pole faces, a flat armature ring overlapping all four of said pole faces and adapted for axial gripping engagement therewith, said armature ring having an annular groove shallower than the ring and disposed intermediate the edges thereof in register with said first groove, and means supporting said inner ring and said armature ring for relative rotation about said axis, said rings cooperating with each other to form a toroidal flux path extending zigzag fashion and alternately back and forth through said four pole faces and said armature a plurality of times.

2. In a magnetic torque producing device, the combination of inner and outer tubular rings of magnetic material concentric with a common axis and having first and second pole faces at one of their ends lying in a common transaxial plane, angularly spaced and radially disposed flat spokes of the same material as said rings paralleling said plane and joined integrally at their inner and outer ends to the respective rings intermediate the ends of the latter so as to connect said rings rigidly together, the combined cross-sectional area of said spokes being a small fraction of the area of one of said pole faces whereby to avoid substantial by-passing of flux between said rings and through said spokes, a flat ring of magnetic material narrower than the radial spacing of said pole faces lying against and rigidly secured to said spokes with the inner and outer edges of the ring spaced radially from said inner and outer rings, a flat armature ring overlapping said pole faces and said flat ring adapted for axial gripping engagement therewith, said armature ring having an annular groove shallower than the ring and opening toward said flat ring intermediate the edges thereof, and means supporting said inner tubular ring and said armature ring for relative rotation about said axis, said rings cooperating with each other to form a toroidal flux path extending zigzag fashion back and forth through said armature ring and said four pole faces a plurality of times.

3. A magnetic torque producing device as defined in claim 2 including a thin sheet of non-magnetic metal interposed between said flat ring and each of said spokes and bonded thereto.

References Cited in the file of this patent

UNITED STATES PATENTS

| 786,412 | Cutler | Apr. 4, 1905 |
| 1,622,261 | Payne | Mar. 22, 1927 |
| 2,267,114 | Lear et al. | Dec. 23, 1941 |
| 2,273,073 | Stockwell et al. | Feb. 17, 1942 |
| 2,522,622 | Laurant | Sept. 19, 1950 |
| 2,739,683 | Gamundi | Mar. 27, 1956 |
| 2,739,684 | Meyer | Mar. 27, 1956 |
| 2,796,962 | Pierce | June 25, 1957 |

FOREIGN PATENTS

| 197,152 | Austria | Apr. 10, 1958 |